United States Patent
Joergensen

(10) Patent No.: US 9,602,647 B2
(45) Date of Patent: Mar. 21, 2017

(54) CALL MANAGEMENT THROUGH A HANDS FREE COMMUNICATION DEVICE

(71) Applicant: GN Netcom A/S, Ballerup (DK)

(72) Inventor: Soeren Arne Joergensen, Ballerup (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 14/799,959

(22) Filed: Jul. 15, 2015

(65) Prior Publication Data

US 2015/0319278 A1 Nov. 5, 2015

Related U.S. Application Data

(63) Continuation of application No. 13/742,517, filed on Jan. 16, 2013, now abandoned.

(30) Foreign Application Priority Data

Jan. 16, 2012 (DK) .................................. 2012 00042

(51) Int. Cl.
*H04M 3/436* (2006.01)
*H04M 1/60* (2006.01)
(Continued)

(52) U.S. Cl.
CPC ........... *H04M 1/6066* (2013.01); *H04M 1/57* (2013.01); *H04M 1/72533* (2013.01); *H04M 1/2535* (2013.01); *H04M 2250/02* (2013.01)

(58) Field of Classification Search
CPC .............................. H04M 3/436; H04W 4/008
See application file for complete search history.

(56) References Cited

U.S. PATENT DOCUMENTS 6,272,359 B1* 8/2001 Kivela .................... H04B 1/38
455/557
8,712,390 B2* 4/2014 Shah ................. H04M 3/42042
379/88.21
(Continued)

FOREIGN PATENT DOCUMENTS

CN 101965689 2/2011
CN 102132543 7/2011
(Continued)

OTHER PUBLICATIONS

Danish Search Report dated Aug. 30, 2012 for Danish Application No. PA 2012 00042.
(Continued)

*Primary Examiner* — Cindy Trandai
(74) *Attorney, Agent, or Firm* — Altera Law Group, LLC

(57) ABSTRACT

A hands free communication device (2), such as a headset, adapted to be simultaneously connected to a first telecommunication device (2) and a second telecommunication device (3). The hands free communication device (2) is adapted to send a call status signal to the first telecommunication device (3) upon reception of a corresponding call status signal from the second telecommunication device (4) and to send a call status signal to the second telecommunication device (4) upon reception of a corresponding call status signal from the first telecommunication device (3). The invention also relates to a system implementing such a hands free device (2) and a method using such a system.

18 Claims, 1 Drawing Sheet

(51) Int. Cl.
*H04M 1/57* (2006.01)
*H04M 1/725* (2006.01)
*H04M 1/253* (2006.01)

(56) References Cited

U.S. PATENT DOCUMENTS

| | | | |
|---|---|---|---|
| 2002/0068600 A1* | 6/2002 | Chihara | H04B 1/385 455/557 |
| 2002/0115479 A1* | 8/2002 | Tischler | H04M 1/05 455/575.5 |
| 2003/0003907 A1* | 1/2003 | Lai | H04M 1/575 455/425 |
| 2005/0180556 A1* | 8/2005 | Satoh | H04M 1/6083 379/373.01 |
| 2006/0040646 A1 | 2/2006 | Moody et al. | |
| 2006/0135197 A1* | 6/2006 | Jin | H04M 1/274583 455/550.1 |
| 2006/0177086 A1* | 8/2006 | Rye | H04R 1/345 381/370 |
| 2006/0286972 A1 | 12/2006 | Kates | |
| 2007/0026908 A1 | 2/2007 | Chen | |
| 2007/0173227 A1 | 7/2007 | Brink et al. | |
| 2007/0263892 A1 | 11/2007 | Glezerman | |
| 2008/0085746 A1* | 4/2008 | Ray | H04W 36/30 455/575.1 |
| 2009/0160802 A1* | 6/2009 | Yasumi | G06F 3/04883 345/173 |
| 2009/0170436 A1* | 7/2009 | Olofsson | H04B 1/385 455/41.3 |
| 2009/0305632 A1* | 12/2009 | Sarkissian | H04M 1/6066 455/41.2 |
| 2010/0057882 A1 | 3/2010 | Haartsen et al. | |
| 2010/0060549 A1 | 3/2010 | Tsern | |
| 2010/0066677 A1* | 3/2010 | Garrett | G06F 1/1626 345/163 |
| 2010/0150383 A1 | 6/2010 | Sampat | |
| 2010/0159830 A1 | 6/2010 | Findlay et al. | |
| 2010/0304674 A1* | 12/2010 | Kim | H04W 76/02 455/41.2 |
| 2011/0059769 A1* | 3/2011 | Brunolli | G08C 17/02 455/556.1 |
| 2011/0207447 A1 | 8/2011 | Bhow | |
| 2011/0225330 A1* | 9/2011 | Lavian | H04M 1/72527 710/63 |
| 2011/0294423 A1 | 12/2011 | Lin | |
| 2011/0300804 A1* | 12/2011 | Lu | H04B 10/1141 455/41.3 |
| 2012/0086768 A1 | 4/2012 | Lau et al. | |
| 2012/0231769 A1* | 9/2012 | Sakissian | H04M 1/6066 455/414.1 |
| 2013/0065637 A1* | 3/2013 | Tasker | H04M 1/6066 455/553.1 |
| 2013/0260672 A1 | 10/2013 | Patil et al. | |

FOREIGN PATENT DOCUMENTS

| | | |
|---|---|---|
| EP | 0840465 | 5/1998 |
| EP | 2375709 | 10/2011 |
| EP | 2248271 | 12/2011 |
| WO | WO 03039023 | 5/2003 |
| WO | WO 2010/107660 | 9/2010 |

OTHER PUBLICATIONS

The Extended European Search Report issued by EPO on Apr. 10, 2013 for corresponding EP application No. 13150483.9.
Chinese Office Action with translation in English for Chinese application No. 2013100146776.

* cited by examiner

CALL MANAGEMENT THROUGH A HANDS FREE COMMUNICATION DEVICE

TECHNICAL FIELD

The invention relates to a hands free communication device adapted to be simultaneously connected to a first telecommunication device and a second telecommunication device. The invention also relates to a system comprising such a hands free communication device and a method of remote controlling a telecommunication device by means of another telecommunication device in a communication system.

BACKGROUND ART

Today, many people all over the world use several different telecommunication devices such as PSTN desktop phones, IP desktop phones, PC softphones and mobile phones etc. Especially smart phones and IP telephony (IP desk phones and PC softphones) have become popular the recent years. Smart phones are advantageous as the user can move around while having a conversation with other call participants. PSTN and IP telephony is advantageous as it often provides telephony at low rates and good audio quality.

Mobile phones, smart phones, tablet computers or the like are often wirelessly connected to hands free communication devices such as headsets, speakerphones, wireless speakers etc. in order to transfer the audio to and from a hands free communication device, which is more convenient to use in the actual situation. F. ex. a user may use a headset or an in-car speakerphone while driving, as the hands are free for driving. Another example includes connecting a smart phone to a wireless speaker in order to share music with other persons. It is also an advantage to connect a wireless speaker to a tablet computer or laptop computer as the built in loudspeaker of these devices normally has a poor sound quality.

Often a user is in a scenario where he is using a headset and has several telecommunication devices within reach, and it may be confusing to switch between different user interfaces.

A hands free communication device according to the preamble of claim 1 is known from EP 2248271 B1.

DISCLOSURE OF INVENTION

The object of the invention is to provide a hands free communication device with improved functionality. The hands free communication device is according to the invention adapted to send a call status signal to the first telecommunication device upon reception of a corresponding call status signal from the second telecommunication device and to send a call status signal to the second telecommunication device upon reception of a corresponding call status signal from the first telecommunication device. Thus, the user using the hands free device may by means of the first telecommunication device be informed about call status on the second telecommunication device and vice versa. This may be advantageous, if for example only one of the telecommunication devices is within visible, audible or other kind of "sensory" reach. It is advantageous to exchange the call status via the hands free device, as the telecommunication devices may already be connected to this for exerting hands free communication.

The hands free communication device may be adapted to be wirelessly connected by means of a first radio link to the first telecommunication device and by means of a second radio link to the second telecommunication device. The radio links may be according to the Bluetooth standard, DECT standard, IEEE 802.11 standard or other radio standards.

According to a preferred embodiment, the hands free device is a headset comprising a speaker, a microphone and attachment means.

Alternatively, the hands free device could be a speakerphone or conferencing device comprising a microphone and a speaker.

The hands free communication device may be adapted to send remote control commands to the first telecommunication device upon reception of corresponding remote control signals from the second telecommunication device and to send remote control signals to the second telecommunication device upon reception of corresponding remote control signals from the first telecommunication device. Thus, a user may control the first telecommunication device via the user interface of the second telecommunication device and vice versa.

The remote control signals may comprise instructions to accept an incoming call. Thus, a user may accept an incoming call on f. ex. a softphone by means of the user interface of f. ex. a smart phone and converse via headset or speakerphone connected to both.

The remote control signals may also comprise instructions to make an outgoing call. Thus, the user may by means of f. ex. a smart phone select a contact and making a call on f. ex. a softphone on a computer.

In addition, the user may select, which call is routed to the hands free device, if there are simultaneous calls on both telecommunication devices. Also, the user may put a first call on hold, while a second call is answered.

The invention also relates to a communication system comprising such a hands free device, a first telecommunication device, and a second telecommunication device.

According to an embodiment, the first telecommunication device comprises a first display and the second telecommunication device comprises a second display.

The user may by means of the first display be able to select a contact stored on the second telecommunication device. Thus, the user may select f. ex. a Lync® contact or Skype® contact on a PC by scrolling the display of a smart phone. This may require a continuous updating or synchronization between the two telecommunication devices.

According to an embodiment, the user may be able to initiate a call on the second telecommunication device by directly selecting the contact on the second telecommunication device without forwarding the contact details such as phone number from the first telecommunication device to the second telecommunication device. Thus, the first telecommunication device may act like a pure remote control sending only simple commands.

According to an embodiment, a graphical user interface widget on the first display is replicated on the second display. Thus, the user may experience a uniform graphical interface on both telecommunication devices.

The first telecommunication device may be a smart phone and the second telecommunication device may be a computer with a softphone.

Presence status, such as in a mobile phone call, in a soft phone call, in a meeting etc. may be exchanged between the two telecommunication devices.

The invention also relates to a method of remote controlling a telecommunication device by means of another telecommunication device in a communication system mention above, which method includes a first step wherein an incoming call on the first telecommunication device is accepted by sending a call accept command from the second telecommunication device to the hands free communication device, which in turn sends a call accept command to the first telecommunication device, which method includes a second step wherein an incoming call on the second telecommunication device is accepted by sending a call accept command from the first telecommunication device to the hands free communication device, which in turn sends a call accept command to the second telecommunication device.

BRIEF DESCRIPTION OF THE DRAWINGS

The invention is explained in detail below with reference to the drawing illustrating a preferred embodiment of the invention and in which.

Figure 1:
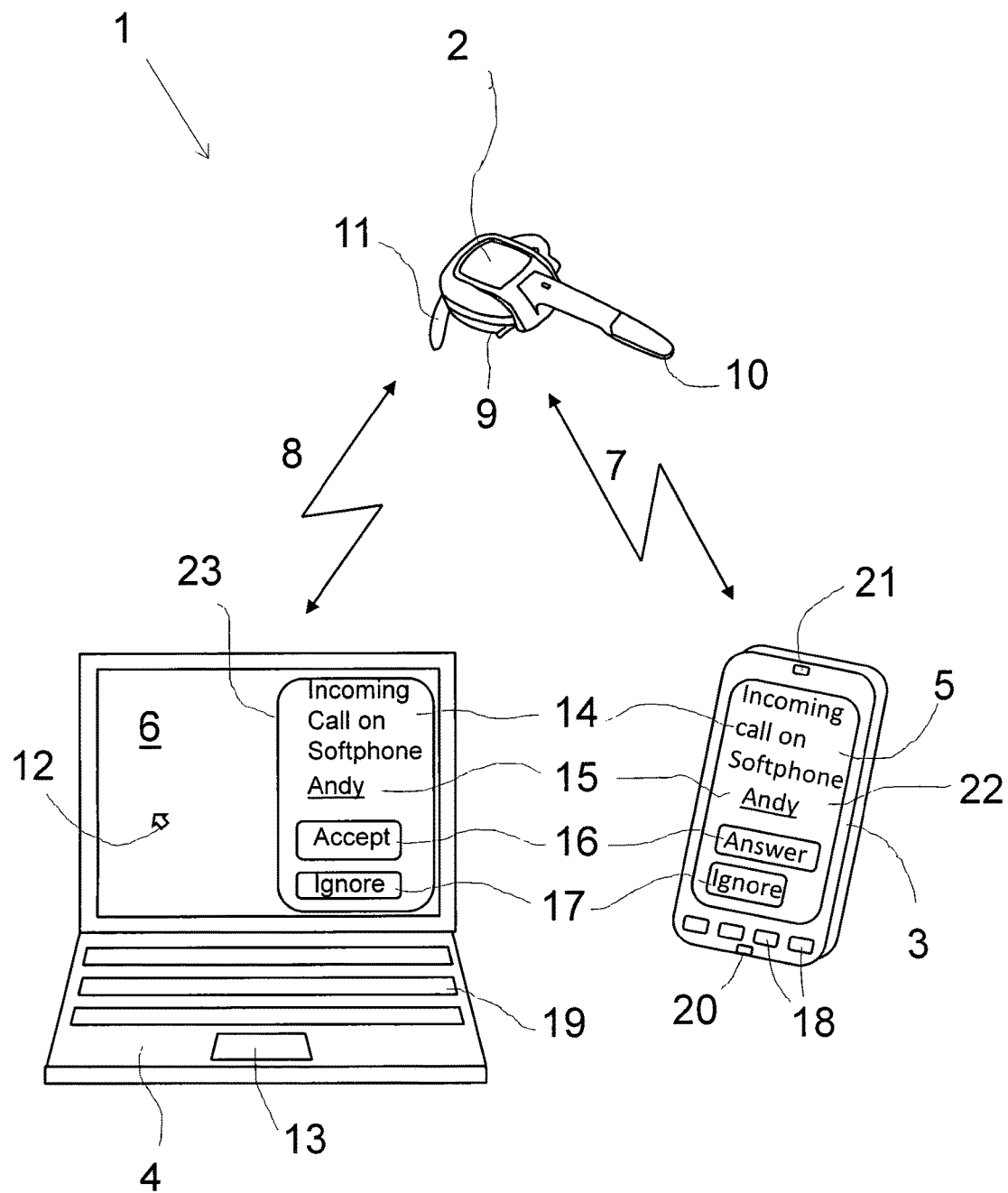
FIG. 1 is a schematic view of a system including a headset according to the invention.

The following reference signs are used in the figures and the following detailed description of the preferred embodiment.

1 communication system
2 headset
3 smart phone
4 laptop computer
5 smart phone display
6 computer display
7 Bluetooth link
8 Bluetooth link
9 headset speaker
10 headset microphone
11 ear hook
12 cursor
13 touch pad
14 first text field
15 second text field
16 "accept" button
17 "ignore" button
18 hard buttons
19 keypad
20 microphone
21 speaker
22 GUI widget
23 GUI widget

MODES FOR CARRYING OUT THE INVENTION

FIG. 1 discloses a schematic view of a system 1 according to the invention. The system 1 comprises a wireless headset 2, a smart phone 3 and a laptop computer 4. The headset 2 comprises a speaker 9, a microphone 10 and is wirelessly connected to the smart phone 3 via a first Bluetooth link 7 and wirelessly connected to the laptop computer 4 via a second Bluetooth link 8. As shown in FIG. 1, the smart phone 3 comprises a touch screen display 5, hard buttons 18, a microphone 20 and a speaker 21. The smart phone 3 also comprises a not shown built-in Bluetooth transceiver and a cellular network transceiver. The laptop computer 4 comprises a computer display 6, a touch pad 13 and a keypad 19. The computer 4 may have a built-in Bluetooth transceiver, or as an alternative, a so-called Bluetooth dongle or other Bluetooth transceiver may be connected to a port of the laptop computer.

A mobile application or "app" is installed on the smart phone 3. The computer 4 is connected to the Internet and a softphone (IP telephony software) is installed on it, whereby the computer 4 can be regarded as a telecommunication device. An app corresponding to the mobile app on the smart phone is installed on the laptop computer 4. The headset 2 is adapted or programmed to cooperate with these apps, whereby the smart phone 3 and the computer 4 can communicate with each other through the headset 2. The apps and the headset 2 make it possible to replicate call status between the smart phone 3 and the computer 4. Thus, it is possible to see on the smart phone display 5, whether there is an active call, an outgoing call, an incoming call etc. on the softphone on the computer 4. In addition, it is possible to see on a GUI (Graphical User Interface) widget on the computer display 6 whether there is an active call, an outgoing call, an incoming call etc. on the smart phone 3. Furthermore, it is possible to manage calls on the computer 4 by means of the user interface of the smart phone 3 and to manage calls on the smart phone 3 by means of the user interface of the computer 4.

FIG. 1 discloses a scenario where there is an incoming call from a contact saved in the computers address book as "Andy". A GUI widget 23 on the computer display 6 comprises a first text field 14 telling that there is an incoming call on the softphone. A second text field 15 indicates that the caller is "Andy". A soft button 16 for accepting the call and a soft button 17 for ignoring the call are also visible. The user can move a cursor 12 on the computer display 6 by means of the touch pad 13 to the soft button 16 and activate this button if he wants to accept the call. If the call is accepted, the user may converse with Andy via the headset 2.

The smart phone display 5 shows a similar GUI widget with corresponding text fields 14, 15 and soft buttons 16, 17. Thus, the user may also accept an incoming call on the computer softphone by touching the button 16 on the touch screen display 5 on the smartphone 4. This is possible, as the smart phone sends an "accept call" command to the headset 2, which in turn send an "accept call" command to the computer 4. This possibility is practical in a situation, where a user is not in front of his computer 4, but wearing his headset 2, which is connected to the computer 4 by the Bluetooth link 8, and is having his smart phone 3 in his pocket or hand. In this situation, he can see, who is calling on the smart phone's display 5, and accept the call if he wishes.

The opposite scenario is also possible. The user may be sitting in front of his computer 4, while there is an incoming call on his smart phone 3, which he has left in a pocket of his coat hanging in the other end of the office. The user can see on the computer display 6, that there is an incoming call on the smart phone 3 from a given person. If he wishes to accept the call, he activates the "Accept" button 16 on the computer display 6, whereby the computer 6 sends an "accept call" command to the headset 2, which in turn sends an "accept call" command to the smart phone 3. If he wishes to ignore the call, he may do this by activating the "ignore" button 17 on the computer display 12. In this case, the computer sends an "ignore call" command to the headset 2, which in turn sends an "ignore call" command to the smart phone 3. Thus, the call may be ignored quickly, whereby eventual disturbance of other people in the office may be minimized.

The apps may also be used to replicate presence status of the user and contacts in the communication software between the communication devices 3, 4.

Other commands, such as "volume up", "volume down", "mute" may be exchanged between the telecommunication devices 3, 4 through the hands free device 2.

The headset 2 and the telecommunication devices 3, 4 may be set to auto-connect when they are within range, which will ease the overall call handling.

The headset 2 shown here is a monaural headset with an ear hook 11 for attaching it to the users ear. However, other kinds of headsets could be contemplated, such as a duo headset with headband, neckband or other attachment means.

In most cases, a user would converse by using the headset. However, it is not precluded that the user may converse with another call participant of a softphone call via the microphone and speaker of the smart phone. However, this requires that the headset is able to handle two simultaneously open audio links.

Also, other hands free communication devices such as speakerphones could be utilised in place of a headset.

The invention could also be utilized with other telecommunication devices than shown here, and two similar or even identical telecommunication devices could be used in one system. Thus, the following combinations are covered by the invention: a Bluetooth headset connected to two smart phones; a speakerphone (conferencing device) connected to a PSTN desk phone and a mobile phone; a headset with a wired connection to an IP desk phone and wirelessly connected to tablet computer (with a softphone); and a speaker phone connected to a laptop computer and a tablet computer.

It is also possible, that the hands free device is connected to more than two telecommunication devices. F. ex it could be contemplated that a headset is simultaneously connected to desk top computer with Microsoft Lync®, a tablet PC with Skype® and a smart phone. If the user is in a call on the smart phone, the presence status information on Lync® and Skype® could be updated, so other users of these systems can see that the user is in a mobile call.

The invention claimed is:

1. A bridging communications system comprising:
   a. a hands free user worn-hands free device
   b. first and second telecommunications devices adapted to be simultaneously connected to the hands free device
   c. wherein the hands free communication device is a wireless headset is connected as an audio bridging link and is adapted to automatically send a call status signal to the first telecommunication device upon reception of a corresponding call status signal from the second telecommunication device, the call status signal being sent from said second telecommunications device to said first telecommunications device via said hands free device, and to automatically send a call status signal to the second telecommunications device upon reception of a corresponding call status signal from the first telecommunications device, the call status signal being sent from said first telecommunications device to said second telecommunications device via said hands free device;
   d. wherein said hands free device includes an exchanger to send call status information from one telecommunications device to the other so that call status information is transferred from one telecommunications device to the other via said hands free device without said telecommunications devices having to communicate directly with each other to report call status.

2. A communications system according to claim 1, further including a signal to accept an incoming call.

3. A communications system according to claim 1, further including a signal to make an outgoing call.

4. A communications system device according to claim 1, wherein the hands free device functions to bridge call status information between said first and second device.

5. A communications system according to claim 1, which is adapted to be wirelessly connected by a first radio link to the first telecommunications device and a second radio link to the second telecommunications device.

6. A communications system according to claim 5, wherein the first radio link and the second radio link are following the Bluetooth® standard.

7. A communications system according to claim 1 being a hands free device comprising a speaker, a microphone and attachment to a headset wearer.

8. A communications system according to claim 1, wherein the first telecommunications device comprises a first display and the second telecommunications device comprises a second display.

9. A communication system according to claim 8, wherein a graphical user interface widget on the first display is replicated on the second display.

10. A communication system according to claim 8, wherein the first telecommunications device is a smart phone and the second telecommunications device is a computer with a softphone.

11. A communication system according to claim 8, wherein the user is able to select a contact stored on the second telecommunications device by a display screen.

12. A communication system according to claim 11, wherein the user can initiate a call on the second telecommunications device by directly selecting the contact on the first telecommunications device without forwarding the contact details such as phone number from the first telecommunications device to the second telecommunications device.

13. A communication system according to claim 1, wherein presence status, is selected from the following a mobile phone call, a soft phone call, or in a meeting is exchanged between the first telecommunications device and the second telecommunications device.

14. A communication device according to claim 1 wherein the hands free communication device is a wireless headset worn on the ear.

15. A communication device according to claim 14 wherein the hands free communication device is user worn.

16. A method of remotely linking call status information between first and second telecommunications device through a third wireless hands free device comprising the method of: wherein incoming call is accepted by said first telecommunications device; incoming call status is then made visible on the second telecommunications device by call status indication being generated by said first telecommunications device and then transmitted to said second telecommunications device without said first or second telecommunications devices having a direct link therebetween and wherein an incoming call on the first telecommunications device is accepted by sending a call accept command from the second telecommunications device to said wireless handsfree device, which in turn sends a call accept command from said hands free device to the first telecommunications device, which method includes a further step wherein
   said hands free headset device send a call status update to said second communications device indicating that a call has been accepted on said first telecommunications device;

establishing an audio connection between said first telecommunications device and said hands free headset device, so that the user can communicate to a third party via said first telecommunications device and while said second communications device indicates that an ongoing call has been accepted with said first telecommunications device.

17. A method of remote controlling a telecommunication device by another telecommunication device in a communication system which method includes:
- configuring a wireless hands free headset device to monitor call status from first and second telecommunications devices;
- configuring the first telecommunications device to send a call status message to said hands free device;
- configuring the second communication device to send a call status message to said hands free device;
- configuring the hands free device to, in turn, send a call status from the one communication device to the other communication device via said hands free device and without the need for a direct link between the first and second telecommunications devices and transferring call status from one telecommunications device to the other, so that both communication devices have synchronized call status information provided through the hands free device, whereby a user can determine call status from a display on either device which is therefore an accurate representation of current call status on either device.

18. A communications system comprising:
a. a hands free user worn device devoid of user interactive digital display screen;
b. first and second telecommunications devices adapted to be simultaneously connected to the hands free device
c. wherein the hands free communication device is a wireless headset and is adapted to automatically send a call status signal to the first telecommunications device upon reception of a corresponding call status signal from the second telecommunications device and to automatically send a call status signal to the second telecommunications device upon reception of a corresponding call status signal from the first telecommunications device;
d. wherein said hands free device includes an exchanger bridge to send call status information from one telecommunication devices to the other without requiring a direct link between said first and second telecommunications devices so that call status information is transferred from one telecommunications device to the other via said hands free device.

* * * * *